(12) United States Patent
Lewis

(10) Patent No.: US 6,317,393 B1
(45) Date of Patent: *Nov. 13, 2001

(54) METHOD AND APPARATUS FOR CONTROLLING AN OPTICAL HEAD RELATIVE TO AN INITIAL TRACK AND A TARGET TRACK ON A STORAGE MEDIUM HAVING DATA ARRANGED THEREON IN TRACKS

(75) Inventor: David E. Lewis, Black forest, CO (US)

(73) Assignee: Discovision Associates, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,357

(22) Filed: Feb. 13, 1998

Related U.S. Application Data

(62) Division of application No. 08/418,723, filed on Apr. 7, 1995, now Pat. No. 5,719,836.

(51) Int. Cl.[7] .................................................. G11B 7/085
(52) U.S. Cl. ...................................... 369/44.28; 369/53.29
(58) Field of Search .................................... 369/32, 44.25, 369/44.28, 44.34, 54, 58, 53.29, 53.28, 53.31, 53.33

(56) References Cited

U.S. PATENT DOCUMENTS

| | | |
|---|---|---|
| Re. 32,574 | 1/1988 | Ceshkovsky et al. . |
| 4,232,201 | 11/1980 | Canino . |
| 4,375,091 | 2/1983 | Dakin et al. . |
| 4,406,000 | 9/1983 | Shoji et al. . |
| 4,414,655 | 11/1983 | Shoji et al. . |

(List continued on next page.)

FOREIGN PATENT DOCUMENTS

| | | |
|---|---|---|
| 7900180 | 4/1984 | (BR) . |
| 352131 | 1/1990 | (EP) . |
| 363022 | 4/1990 | (EP) . |
| 435646 | 7/1991 | (EP) . |
| 479473 | 4/1992 | (EP) . |
| 491573 | 6/1992 | (EP) . |
| 522499 | 1/1993 | (EP) . |
| 225877 | 6/1994 | (TW) . |

*Primary Examiner*—W. R. Young
(74) *Attorney, Agent, or Firm*—Keiji Masaki; Steve A. Wong; Caroline T. Do

(57) ABSTRACT

A method for moving an optical head from an initial track to a target track on a storage medium having data arranged in tracks thereon. The method includes determining a track crossing number indicating a number of tracks between the initial track and the target track, moving the optical head from the initial track toward the target track, and measuring a reflectivity level of light from the medium. The method continues with deriving a tracking error signal responsive to the reflectivity level. A waveform of the tracking error signal has zero crossings corresponding to the optical head crossing one of the tracks. The method may further include incrementing a track count number for each the zero crossing, and passing the reflectivity level through a high pass filter to obtain a data indicator signal. In this embodiment, a waveform of the data indicator signal has indicator points corresponding to the zero crossings. The method may conclude by decrementing the track count number for each the zero crossing corresponding to changes in the reflectivity level in response to the data, and terminating the step of moving the optical head when the track count number equals the track crossing number. In an alternative method, the passing step may be replaced with deriving a data indicator signal responsive to the reflectivity level. Apparatus for controlling an optical head according to the present methods include a tracking error signal generator, a preamplifier, a track/hold sector, and a track crossing signal generator.

4 Claims, 7 Drawing Sheets

U.S. PATENT DOCUMENTS

| | | |
|---|---|---|
| 4,484,319 | 11/1984 | Koishi et al. .................... 369/44.28 |
| 4,536,863 | 8/1985 | Giddings . |
| 4,627,038 | 12/1986 | Abed et al. . |
| 4,701,898 | 10/1987 | Giddings . |
| 4,706,133 | 11/1987 | Giddings . |
| 4,727,532 | 2/1988 | Giddings . |
| 4,751,692 | 6/1988 | Giddings . |
| 4,774,699 | 9/1988 | Giddings . |
| 4,845,697 | 7/1989 | Giddings . |
| 4,974,220 * | 11/1990 | Harada ......................... 369/44.28 X |
| 5,146,440 | 9/1992 | Yamaguchi et al. .................. 369/32 |
| 5,191,566 | 3/1993 | Yamaguchi et al. .................. 369/32 |
| 5,197,054 | 3/1993 | Harada ......................... 369/44.28 X |
| 5,210,731 | 5/1993 | Katumata . |
| 5,311,490 | 5/1994 | Matoba et al. .................... 369/44.28 |
| 5,351,222 | 9/1994 | Ikeda et al. .................. 369/44.28 X |
| 5,459,705 | 10/1995 | Matoba et al. ............... 369/44.28 X |
| 5,581,526 | 12/1996 | Lewis .............................. 369/44.28 |

\* cited by examiner

METHOD AND APPARATUS FOR CONTROLLING AN OPTICAL HEAD RELATIVE TO AN INITIAL TRACK AND A TARGET TRACK ON A STORAGE MEDIUM HAVING DATA ARRANGED THEREON IN TRACKS

CROSS REFERENCE OF RELATED APPLICATIONS

This application is a divisional of U.S. patent application Ser. No. 08/418,723, filed Apr. 7, 1995, now U.S. Pat. No. 5,719,836.

FIELD OF THE INVENTION

The invention relates to optical systems and, in particular, to seeking by an optical head in an optical system.

DESCRIPTION OF THE BACKGROUND ART

Certain types of storage media have constant reflectivity levels in the data storage areas. Data differentiation may be accomplished by phase comparison or other suitable methods. Other areas on the storage media, such as headers, may have differing reflectivity levels.

In seeking from one track to another, a track crossing number is determined. The track crossing number indicates the number of tracks to be crossed in seeking from an initial track to a target track. When the seek is performed, an actual track crossing count is kept, indicating the number of tracks crossed so far. When the actual track crossing count equals the track crossing number, the seek is finished and the target track has been reached.

In prior art systems, the actual track crossing count could be derived from the tracking error signal. However, if the path of a seek crossed the areas having differing reflectivity levels, the tracking error signal would erroneously indicate that a track had been crossed. Therefore, if the actual track crossing count relied on the tracking error signal, it would equal the track crossing number before the target track had been reached, causing undershoot of the seek and requiring either another seek or a seek correction.

SUMMARY OF THE INVENTION

A method is disclosed for moving an optical head from an initial track to a target track on a storage medium. The total number of tracks to be crossed is determined, and the optical head is moved toward the target track. A reflectivity level of light from the storage medium is measured, and a tracking error signal is derived from the reflectivity level. The tracking error signal has both true and false indicators of track crossings. A data indicator signal is derived from the reflectivity level, having indicator points corresponding to the false indicators of track crossings. A track count number is incremented for each true indicator of a track crossing, and the optical head is stopped when the track count number equals the total number of tracks to be crossed. In yet another method, an optical head is moved from an initial track to a target track on a storage medium. The total number of tracks to be crossed is determined, and the optical head is moved toward the target track. A reflectivity level of light from the storage medium is measured, and a tracking error signal is derived from the reflectivity level. The tracking error signal has both true and false indicators of track crossings. A track count number is incremented for each indicators of track crossings. A data indicator signal is derived from the reflectivity level, having indicator points corresponding to the false indicators of track crossings. The track count number is decremented for each indicator points, and the optical head is stopped when the track count number equals the total number of tracks to be crossed. Another method is disclosed whereby a track count signal is generated from the tracking error signal and the data indicator signal. The track count signal indicates track crossings corresponding to the true track crossing indicators in the tracking error signal. An apparatus is disclosed comprising a sensor for measuring the reflectivity level from a storage medium, a tracking error signal generator for generating a tracking error signal, a preamplifier for generating a data signal, a track crossing signal generator responsive to the tracking error signal, and a track/hold selector responsive to the data signal to direct the track crossing signal generator to generate a track crossing signal without the false track crossing indicators from the tracking error signal. A second apparatus is disclosed comprising a sensor for measuring the reflectivity level from a storage medium, a preamplifier for generating a data signal, a tracking error signal generator responsive to the reflectivity level for deriving a tracking error signal, a track/hold selector to direct the tracking error signal generator to generate a signal of constant amplitude for a predetermined period of time based on the data signal, and a track crossing signal generator responsive to the tracking error signal for deriving a track crossing signal indicating the crossing of an information track by the optical head.

BRIEF DESCRIPTION OF THE DRAWINGS

Further objects of the present invention together with additional features contributing thereto and advantages accruing therefrom will be apparent from the following description of the preferred embodiments of the invention which are shown in the accompanying drawing, wherein.

DETAILED DESCRIPTION OF THE PREFERRED EMBODIMENTS

Figure 1:
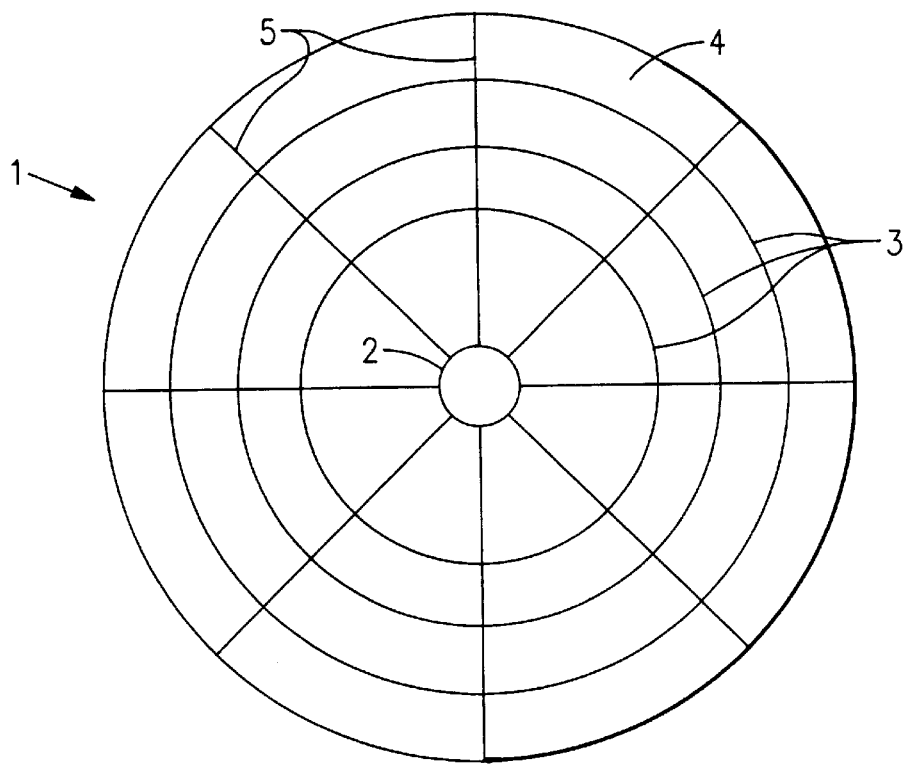
FIG. 1 is a generalized representation of a storage medium adaptable for use with the invention.

Referring to exemplary FIG. 1, there is shown a generalized representation of a storage medium 1 adaptable for use with the invention. The storage medium 1 has a center 2 and data is recorded thereon in information tracks 3 concentric about the center 2. The information tracks 3 may be arranged in a spiral about the center 2. Data is further arranged in sectors 4 separated by radial (or non-radial) sector headers 5.

Figure 2:
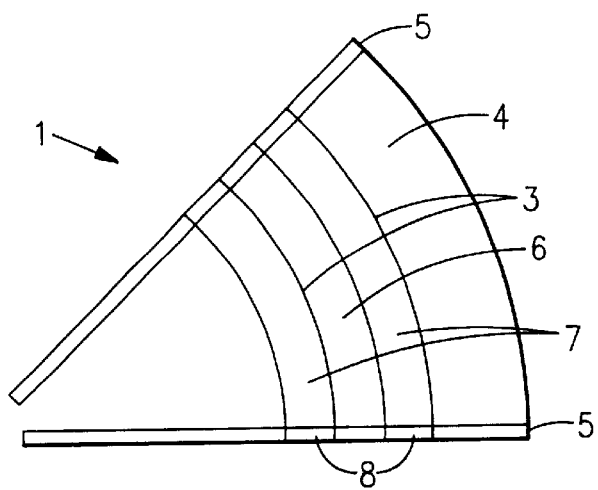
FIG. 2 is an enlargement of a portion of the storage medium shown in FIG. 1.

Referring to exemplary FIG. 2, there is shown an enlargement of a portion of the storage medium 1 shown in exemplary FIG. 1. Intertrack regions 6 are located concentrically between consecutive information tracks 3. Data may be recorded in segments 7 where the information tracks 3 intersect the sectors 4. Additionally, there is data in header segments 8 where the information tracks 3 intersect the radial (or nonradial) sector headers 5. This data in the header segments 8 is either embossed or otherwise not modifiable by the optical system.

Figure 3:
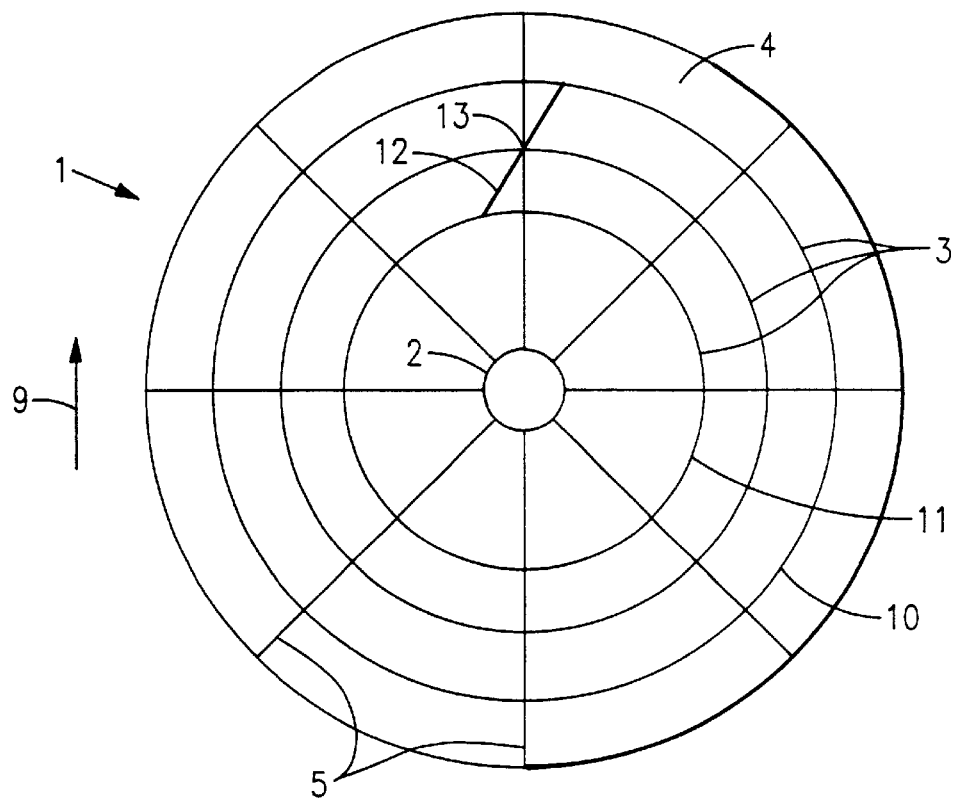
FIG. 3 is a generalized representation of a storage medium adaptable for use with the invention, showing the path traveled by the optical head during a seek.

Referring to exemplary FIG. 3, there is shown a generalized representation of the storage medium 1 shown in exemplary FIG. 1. Additionally, the storage medium 1 is rotating about the center 2 in the direction indicated by arrow 9. To perform a seek from an initial information track 10 to a target information track 11, an optical head (not shown) will travel on a path 12 relative to the storage medium 1. In travelling along the path 12, the optical head (not shown) will cross radial sector headers 5 at intersection points 13.

Figure 4:
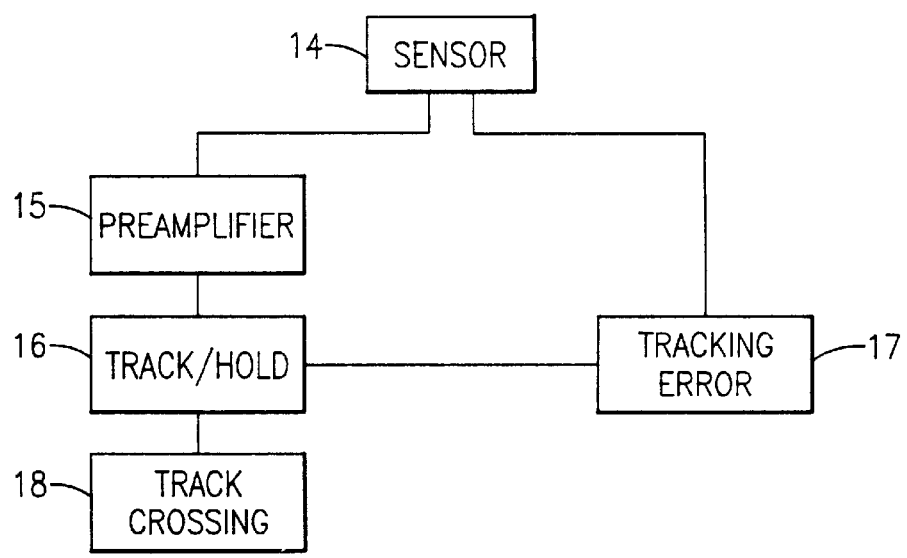
FIG. 4 is a generalized representation of one embodiment of the invention.

Referring to exemplary FIG. 4, there is shown one embodiment of the invention. The apparatus comprises a sensor 14 for detecting a reflectivity level of light reflected from the storage medium 1. The sensor 14 passes the reflectivity level to a preamplifier 15. The preamplifier 15 generates a data signal which is indicative of changes in the reflectivity level in response to data located in the information tracks 3. The preamplifier 15 may contain a high pass filter, through which the data signal is passed. The preamplifier 15 then passes the data signal to a track/hold selector 16.

Figure 5:
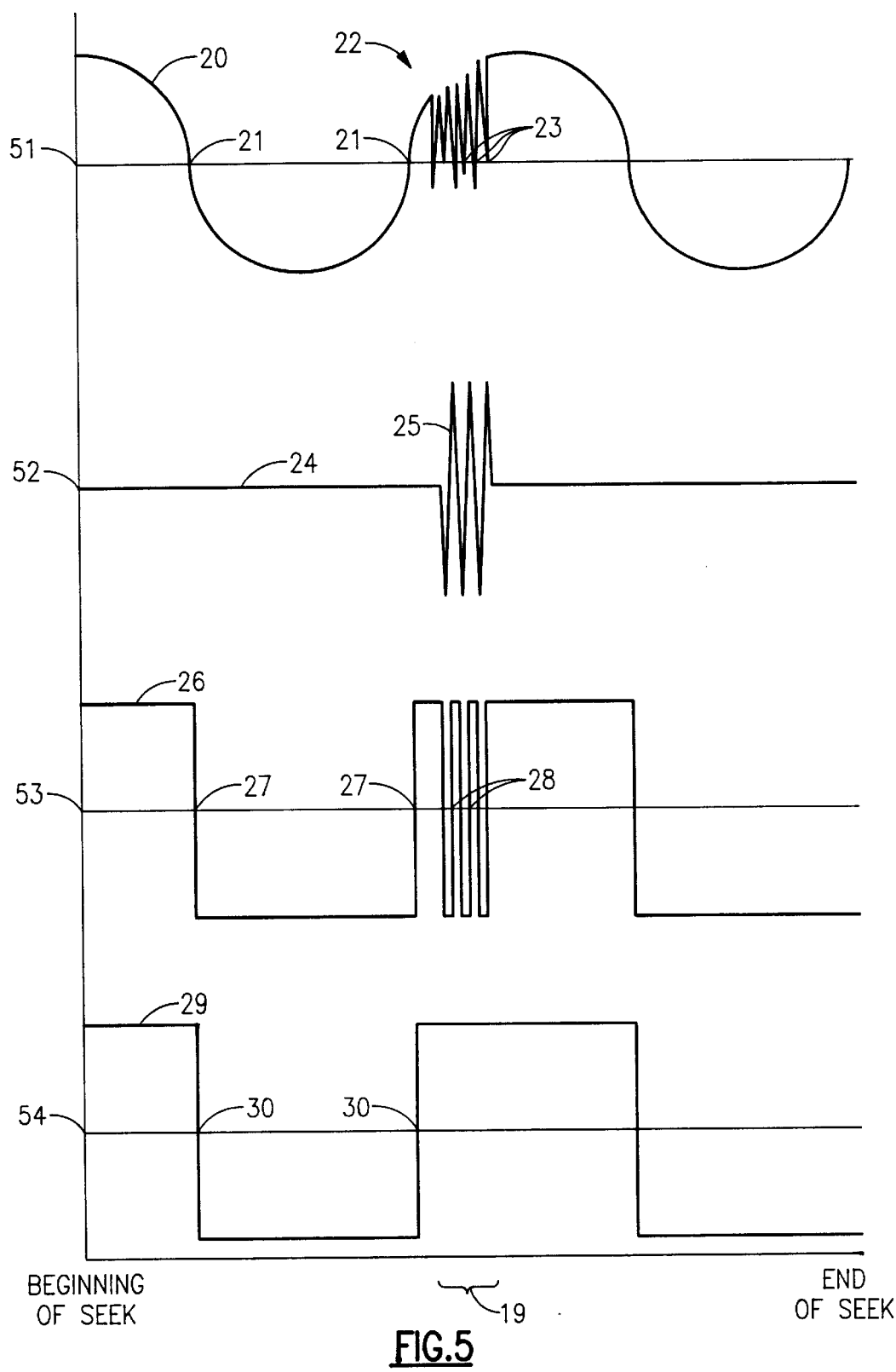
FIG. 5 is a generalized plot of waveforms generated by one embodiment of the invention.
Figure 7:
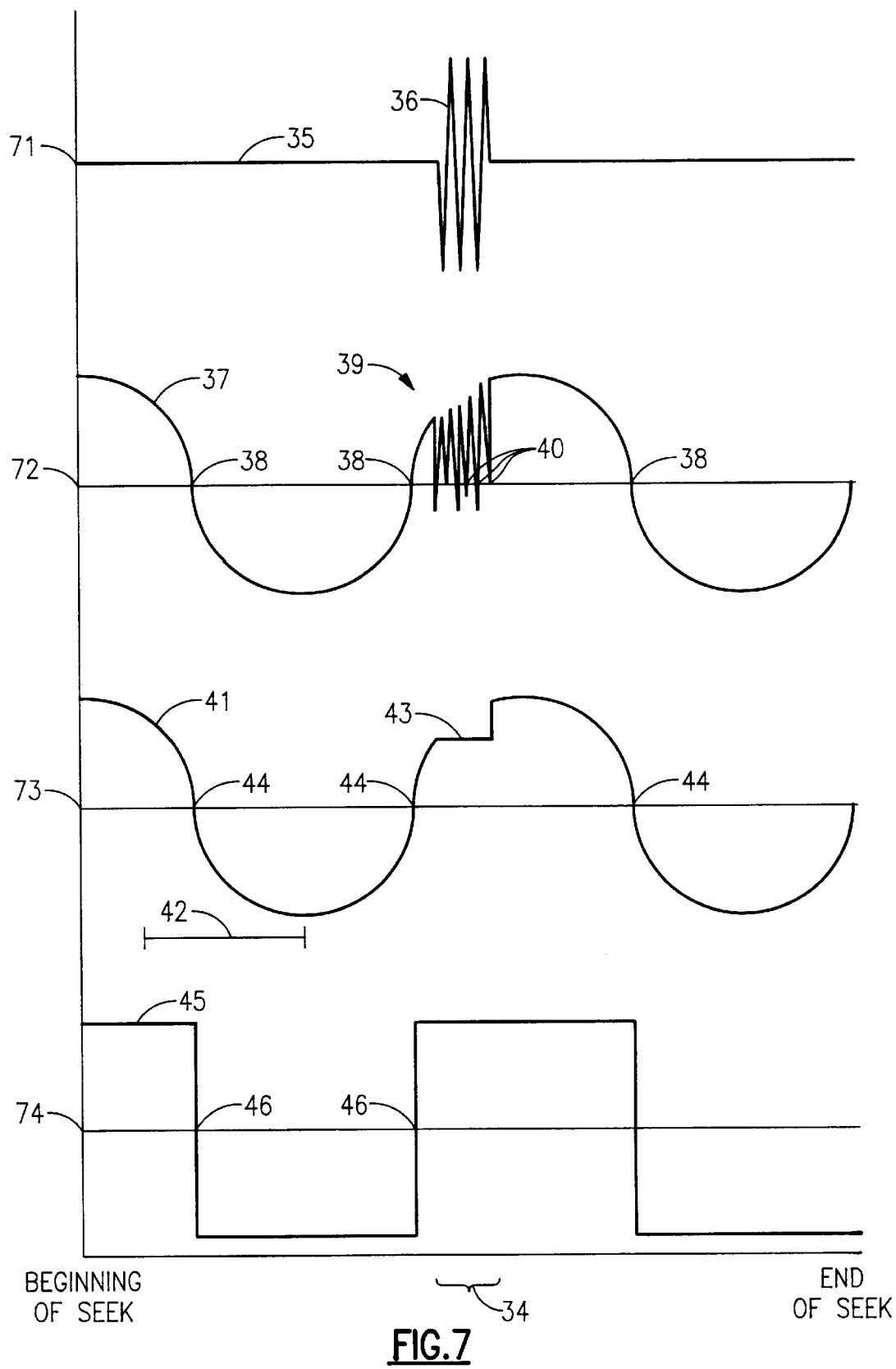
FIG. 7 is a generalized plot of waveforms generated by another embodiment of the invention.

The sensor 14 also passes a signal representing a returning optical pattern to a tracking error signal generator 17. Tracking error can be, and usually is, generated by split or quad detectors. Quad sum detectors (outputting the sum signal of the quad detectors) for servos can also generate track crossing indications. As shown in FIGS. 5 and 7, a "bipolar" signal, generated by split detectors in push pull represents the pattern produced by interference fringes. The tracking error signal generator 16 derives a tracking error signal. The tracking error signal indicates changes in the reflectivity level both in response to data located in the information tracks 3 and in response to the optical head (not shown) crossing an information track 3. The tracking error signal generator 17 then passes the tracking error signal to the track/hold selector 16.

The track/hold selector 16 generates a control signal in response to the data signal. The track/hold selector 16 then passes the control signal and the tracking error signal to a track crossing signal generator 18. The track crossing signal generator 18 creates a track crossing signal in response to the tracking error signal. The track crossing signal is a generally a square waveform corresponding to the tracking error signal. The control signal directs the track crossing signal generator 18 to ignore the portions of the tracking error signal corresponding to portions of the data signal indicating changes in the reflectivity level in response to data located in the information tracks 3. The track crossing signal generator 18 thus generates a track crossing signal indicating changes in the reflectivity level in response to the optical head (not shown) crossing an information track 3.

In operation, a seek is performed from the initial track 10 to the target track 11. A track crossing number is generated, which is equal to the number of tracks between the initial track 10 and the target track 11. The optical head (not shown) is moved from the initial track 10 toward the target track 11. The embodiment of the invention, as described above, responds to light reflected off the storage medium 1 to generate a track crossing signal. A track crossing counter (not shown) counts the number of changes in the reflectivity level indicated in the track crossing signal. When the track crossing counter equals the track crossing number, the optical head (not shown) has reached the target track 11.

Referring to exemplary FIG. 5, there are shown the waveforms of the signals created by components of the above-described embodiment. Each of the waveforms is plotted against time on the horizontal axis, with the beginning of the seek at the left and the end of the seek at the right. The time segment 19 indicates a point when the optical head (not shown) is crossing a header segment 8.

In line 51, there is shown a waveform 20 of the tracking error signal generated by the tracking error signal generator 17. The waveform 20 has zero crossings 21 indicating that the optical head (not shown) has crossed an information track 3. The waveform segment 22 during the time segment 19 shows that the reflectivity level changes in response to data within the header segment 8. Because the waveform segment 22 has zero crossings 23, the tracking error signal, if not corrected, would generate a false track crossing counter number, causing the optical head (not shown) to stop seeking before reaching the target track 11.

In line 52, there is shown a waveform 24 of the data signal generated by the preamplifier 15. The waveform 24 plots the sum reflectivity level from the storage medium 1. As shown, the waveform 24 is relatively flat except at a waveform segment 25 during the time segment 19. Where data within the header segment 8 may cause changes in the sum reflectivity level. The data signal therefore indicates the time segment 19 by the waveform segment 25.

In line 53, there is shown a waveform 26 of an uncorrected track crossing signal generated by a track crossing signal generator according to the prior art. The waveform 26 has zero crossings 27 corresponding to the zero crossings 21 of the waveform 20 of the tracking error signal. However, the waveform 26 also has zero crossings 28 corresponding to the zero crossings 23 of the waveform 20 of the tracking error signal. These zero crossings 28, however, are not indicative of the optical head (not shown) crossing an information track 3. A track crossing counter is based on the number of zero crossings 27, 28 in the waveform 26 of the track crossing signal generator. However, using the waveform 26 from line 53, the track crossing counter would be inaccurate because there would be no differentiation between zero crossings 27 indicating that an information track 3 is crossed and zero crossings 28 responsive to data in the header segments 8.

In line 54, there is shown a waveform 29 of a corrected track crossing signal generated by the track crossing signal generator 18 according to the invention. The track crossing signal generator 18 only generates a zero crossing 30 when both of the following conditions are satisfied. First, the waveform 20 of the tracking error signal must indicate a zero crossing 21. Second, the waveform 24 of the data signal must not indicate that data from the header segment 8 is causing the zero crossing 23. If both conditions are satisfied, the track crossing signal generator 18 generates a zero crossing 30. Therefore, a track crossing counter can count the number of zero crossings 30 in the waveform 29 of the track crossing signal to determine the number of information tracks 3 the optical head (not shown) has crossed.

Figure 6:
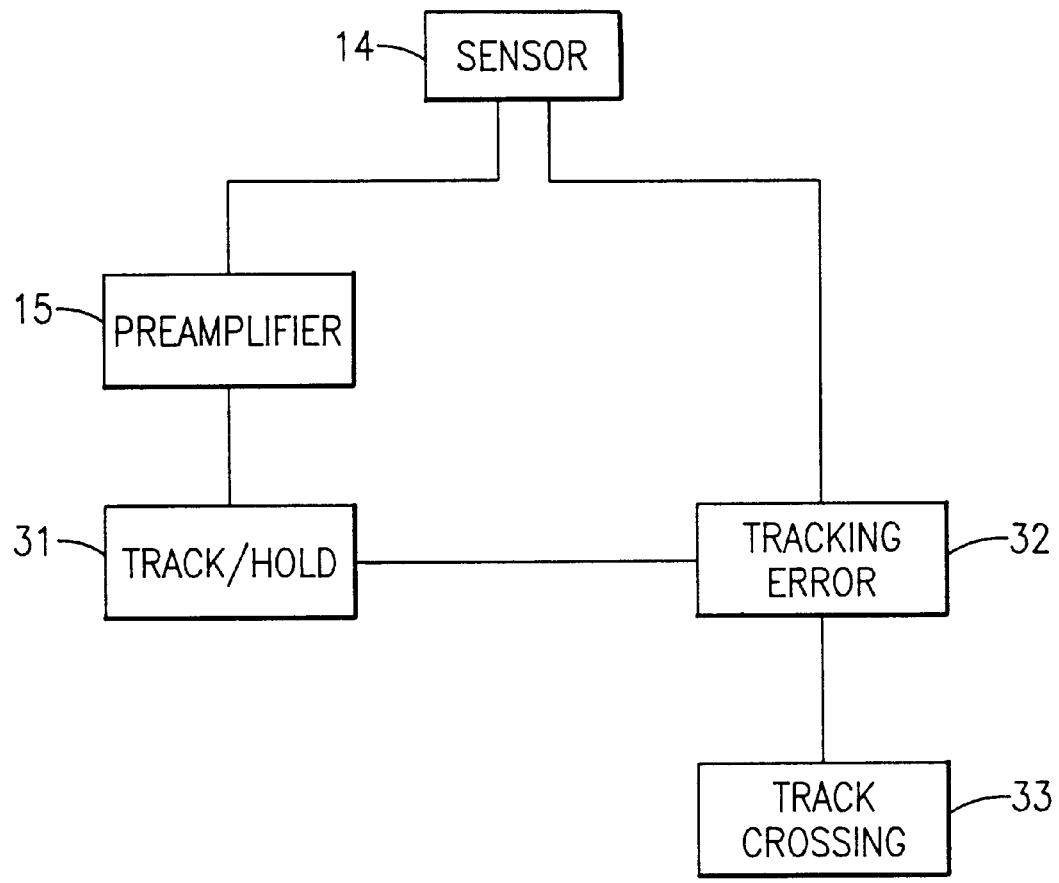
FIG. 6 is a generalized representation of another embodiment of the invention.

Referring to exemplary FIG. 6, there is shown a second embodiment according to the invention. The apparatus comprises a sensor 14 for detecting a reflectivity level of light reflected from the storage medium 1. The sensor passes the reflectivity level to a preamplifier 15. The preamplifier 15 generates a data signal which is indicative of changes in the reflectivity level in response to data located in the information tracks 3. The preamplifier 15 may contain a high pass filter, through which the data signal is passed. The preamplifier 15 then passes the data signal to a track/hold selector 31.

The track/hold selector 31 generates a control signal in response to the data signal. The track/hold selector 31 passes the control signal to a tracking error signal generator 32. The sensor 14 also passes the reflectivity level to the tracking error signal generator 32.

The tracking error signal generator 32 generates a tracking error signal in response to the reflectivity level from the sensor 14 and in response to the control signal from the track/hold selector 31. When the data signal does not indicate that changes in the reflectivity level are in response to data located in the information tracks 3, the control signal directs the tracking error signal generator 32 to generate the tracking error signal in a standard manner known in the art. However, when the data signal indicates that changes in the reflectivity level are in response to data located in the information tracks 3, the control signal directs the tracking error signal generator 32 to generate a flat waveform for a short period of time. The tracking error signal generator 32 then passes the tracking error signal to a track crossing signal generator 33.

The track crossing signal generator 33 generates a track crossing signal, which is a square waveform from the tracking error signal. The track crossing signal indicates the number of changes in the reflectivity level indicated in the tracking error signal. A track crossing counter (not shown) counts the number of changes in the reflectivity level indicated in the track crossing signal. When the track crossing counter equals the track crossing number, the optical head (not shown) has reached the target track 11.

Referring to exemplary FIG. 7, there are shown the waveforms of the signals created by components of the second above-described embodiment. Each of the waveforms is plotted against time on the horizontal axis, with the beginning of the seek at the left and the end of the seek at the right. The time segment 34 indicates a point when the optical head (not shown) is crossing a header segment 8.

In line 71, there is shown a waveform 35 of the data signal generated by the preamplifier 15. The waveform 35 plots the sum reflectivity level from the storage medium 1. As shown, the waveform 35 is relatively flat except at a waveform segment 36 during the time segment 34. Where data within the header segment 8 may cause changes in the sum reflectivity level. The data signal therefore indicates the time segment 34 by the waveform segment 36.

In line 72, there is shown a waveform 37 of an uncorrected tracking error signal generated by a tracking error signal generator according to the prior art. The waveform 37 has zero crossings 38 which correspond to changes in the reflectivity level in response to the optical head (not shown) crossing an information track 3. The waveform also has a waveform segment 39 corresponding to the time segment 34 when the optical head (not shown) is crossing a header segment 8. The waveform segment 39 plots indicates changes in the reflectivity level in response to data within the header segment 8. The waveform segment 39 has zero crossings 40 which correspond to those changes. A track crossing signal created from this waveform 37 would appear similar to the waveform 26 in line 53 of exemplary FIG. 5, and could not be relied on accurately by a track crossing counter.

In line 73, there is shown a waveform 41 of a corrected tracking error signal generated by the tracking error signal generator 32. The waveform 41 is generated as follows. When the changes in the reflectivity level are low frequency, the tracking error signal generator 32 generates a tracking error signal in the standard manner known in the art. This is represented by a waveform segment 42. However, when the tracking error signal generator 32 detects a higher frequency change in the reflectivity level, corresponding to the waveform segment 39 in line 72, the tracking error signal generator 32 looks at the data signal represented by the waveform 35 in line 71. If the data signal is not flat, as in the waveform segment 36, the tracking error signal generator 32 generates a flat waveform segment 43 at the amplitude of the tracking error signal just prior to the detection of the high frequency changes in the reflectivity level. Once the changes in the reflectivity level return to a lower frequency, the tracking error signal generator 32 returns to generating the tracking error signal in the standard manner.

The waveform 41 of the corrected tracking error signal has zero crossings 44 indicating that the optical head (not shown) has crossed an information track 3. Unlike the waveform 37 in line 72 of the uncorrected tracking error signal, the waveform 41 in line 73 of the corrected tracking error signal does not have zero crossings during the time segment 34 corresponding to the zero crossings 40. Therefore, the number of zero crossings 44 in the waveform 41 accurately indicates the number of information tracks 3 crossed by the optical head (not shown).

In line 74, there is shown a waveform 45 of a track crossing signal generated by the track crossing signal generator 33. The waveform 45 is a square waveform of the waveform 41 of the corrected tracking error signal generated by the tracking error signal generator 32. The waveform 45 of the track crossing signal has zero crossings 46 corresponding to the zero crossings 44 in the waveform 41 of the tracking error signal. Therefore, a track crossing counter can count the number of zero crossings 46 in the waveform 45 of the track crossing signal to determine the number of information tracks 3 the optical head (not shown) has crossed.

Figure 8:
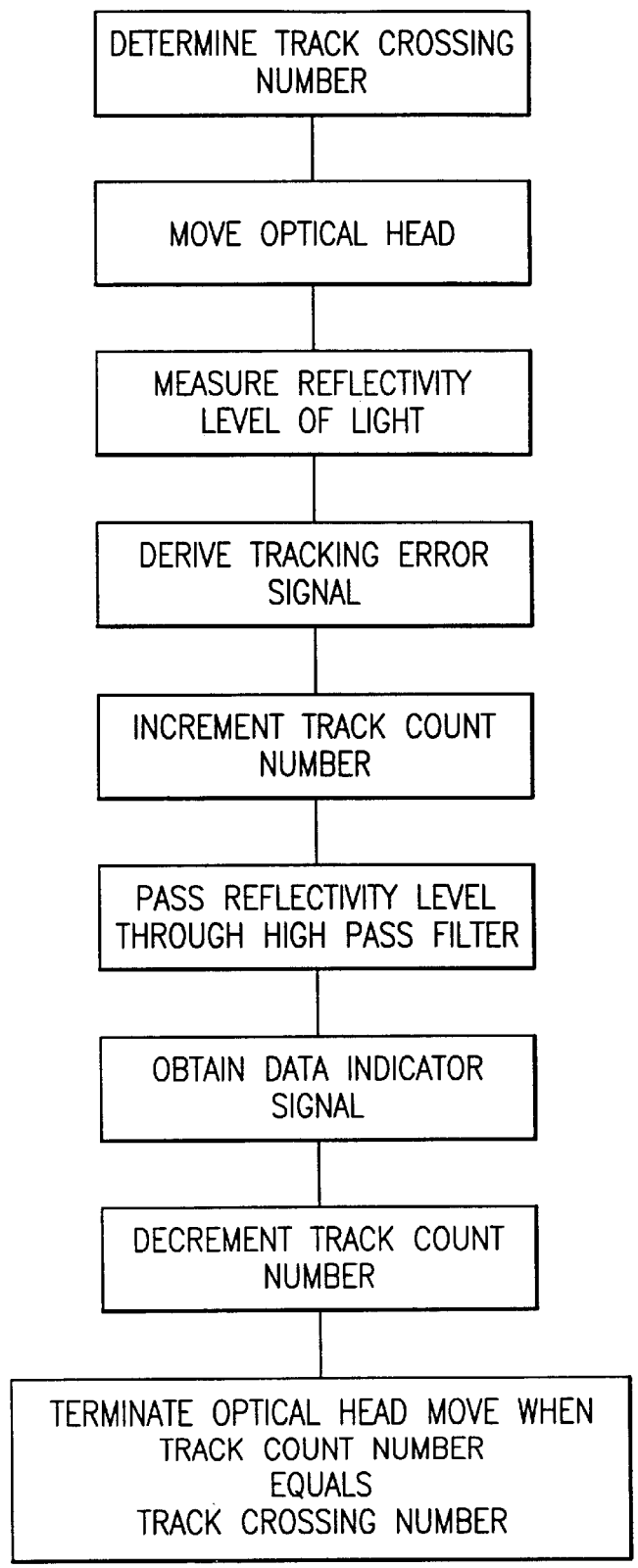
FIG. 8 is a flow diagram of one method according the present invention.

With reference now to FIG. 8, there is shown a flow diagram of a first method according to the present invention. This includes a method for moving an optical head from an initial track to a target track on a storage medium having data arranged in tracks thereon. The method includes the steps of determining a track crossing number indicating a number of tracks between the initial track and the target track, moving the optical head from the initial track toward the target track, and measuring a reflectivity level of light from the storage medium. The present method continues with deriving a tracking error signal responsive to the reflectivity level. A waveform of the tracking error signal has zero crossings corresponding to the optical head crossing one of the tracks and to changes in the reflectivity level in response to the data. In a preferred embodiment of this method according to the present invention, the further steps of incrementing a track count number for each the zero crossing, and passing the reflectivity level through a high pass filter to obtain a data indicator signal may be advantageously performed. In this embodiment, a waveform of the data indicator signal has indicator points corresponding to the zero crossings corresponding to changes in the reflectivity level in response to the data. Finally, the present method may conclude by decrementing the track count number for each the zero crossing corresponding to changes in the reflectivity level in response to the data, and terminating the step of moving the optical head when the track count number equals the track crossing number.

A related method for moving an optical head from an initial track to a target track according to the present invention similarly includes determining a track crossing number indicating a number of the tracks between the initial track and the target track, moving the optical head from the initial track toward the target track, and measuring a reflectivity level of light from the storage medium. In this modified method according to the present invention, the step of deriving a tracking error signal responsive to the reflectivity level is also performed. However, the waveform of the tracking error signal has zero crossings corresponding to the optical head crossing one of the tracks and to increases in frequency of changes in the reflectivity level. This modified method according to the present invention may advantageously continue with incrementing a track count number for each zero crossing, and passing the reflectivity level through a high pass filter to obtain a data indicator signal. A waveform of the data indicator signal may advantageously include indicator points corresponding to the zero crossings corresponding to changes in the reflectivity level in response to the data. As in the above method, this modified version thereof may conclude by decrementing the track count number for each zero crossing corresponding to changes in the reflectivity level in response to the data, and terminating the step of moving the optical head when the track count number equals the track crossing number.

Figure 9:
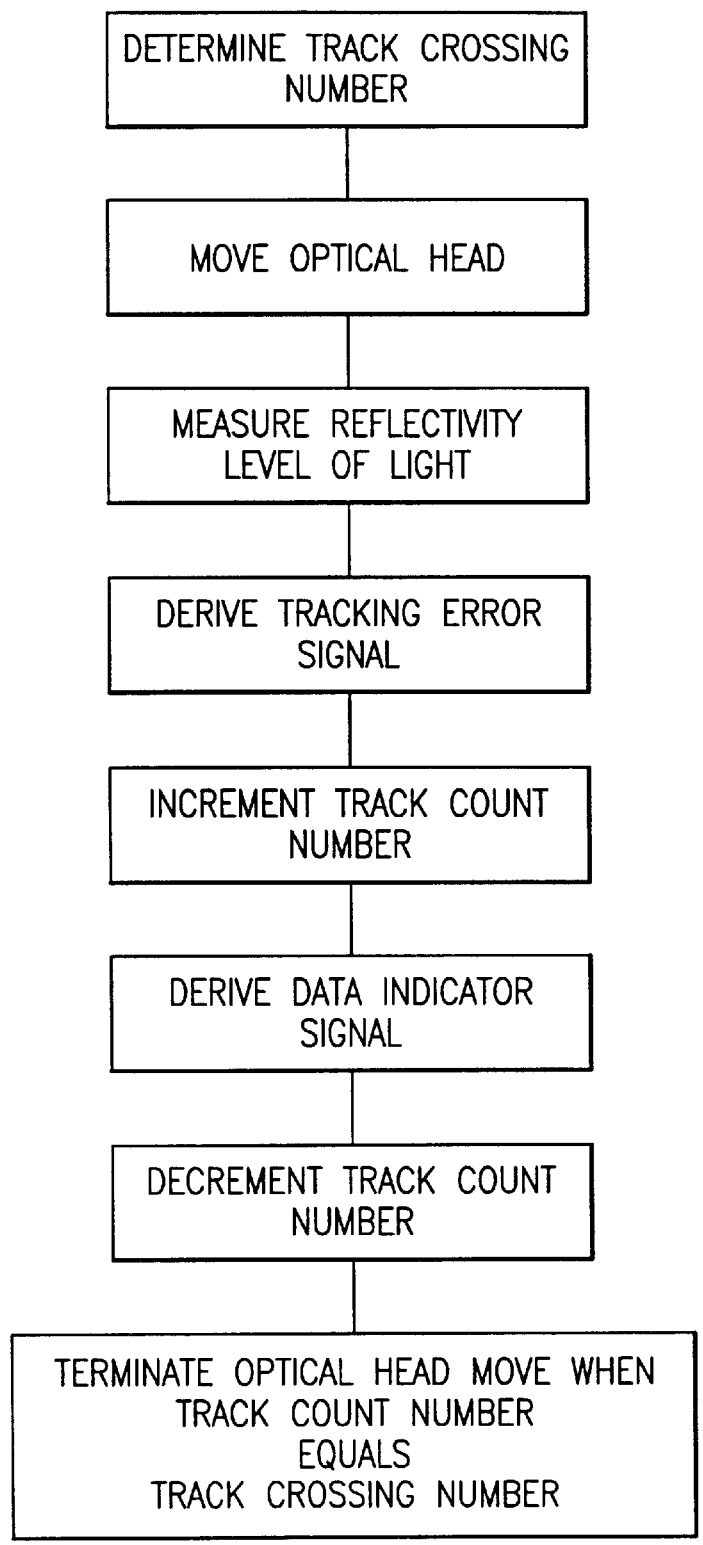
FIG. 9 is a flow diagram of an alternate method according the invention.

With reference now to FIG. 9, there is shown an alternative method according to the present invention. This method is similarly directed to moving an optical head from an initial track to a target track on a storage medium having data arranged in tracks thereon including the steps of determining a track crossing number indicating a number of the tracks between the initial track and the target track, moving the optical head from the initial track toward the target track, and measuring a reflectivity level of light from the storage medium. As above, this alternative method includes deriving a tracking error signal responsive to the reflectivity level. A waveform of this tracking error signal has zero crossings corresponding to the optical head crossing one of the tracks and to changes in the reflectivity level in response to the data. The step of incrementing a track count number for each the zero crossing is also performed. The present method, however, may further include the step of deriving a data indicator signal responsive to the reflectivity level, with a waveform of the data indicator signal having indicator points corresponding to the zero crossings corresponding to changes in the reflectivity level in response to the data. This alternative method may also conclude with the steps of decrementing the track count number for each zero crossing corresponding to changes in the reflectivity level in response to the data, and terminating the step of moving the optical head when the track count number equals the track crossing number.

A related method to the above alternative method for moving an optical head from an initial track to a target track similarly includes the steps of determining a track crossing number indicating a number of the tracks between the initial track and the target track, moving the optical head from the initial track toward the target track, and measuring a reflectivity level of light from the storage medium. In this embodiment of the alternative method, the step of deriving a tracking error signal responsive to the reflectivity level is also performed. However, in this embodiment a waveform of the tracking error signal has zero crossings corresponding to the optical head crossing one of the tracks and to increases in frequency of changes in the reflectivity level. The present method may continued with incrementing a track count number for each the zero crossing, and deriving a data indicator signal responsive to the reflectivity level. In this case, a waveform of the data indicator signal similarly has indicator points corresponding to the zero crossings corresponding to changes in the reflectivity level in response to the data. This embodiment of the present method may also conclude by decrementing the track count number for each zero crossing corresponding to changes in the reflectivity level in response to the data, and terminating the step of moving the optical head when the track count number equals the track crossing number.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A method for moving an optical head from an initial track to a target track on a storage medium having data arranged in tracks thereon, comprising the steps of:

determining a track crossing number indicating a number of said tracks between said initial track and said target track;

moving said optical head from said initial track toward said target track;

measuring a reflectivity level of light from said storage medium;

deriving a tracking error signal responsive to said reflectivity level, wherein a waveform of said tracking error signal has zero crossings corresponding to said optical head crossing one of said tracks and to changes in said reflectivity level in response to said data;

incrementing a track count number for each said zero crossing;

passing said reflectivity level through a high pass filter to obtain a data indicator signal, wherein a waveform of said data indicator signal has indicator points corresponding to said zero crossings corresponding to changes in said reflectivity level in response to said data;

after each said incrementing, decrementing said track count number for each said zero crossing corresponding to changes in said reflectivity level in response to said data; and terminating the step of moving said optical head when said track count number equals said track crossing number.

2. A method for moving an optical head from an initial track to a target track on a storage medium having data arranged in tracks thereon, comprising the steps of:

determining a track crossing number indicating a number of said tracks between said initial track and said target track;

moving said optical head from said initial track toward said target track;

measuring a reflectivity level of light from said storage medium;

deriving a tracking error signal responsive to said reflectivity level, wherein a waveform of said tracking error signal has zero crossings corresponding to said optical head crossing one of said tracks and to increases in frequency of changes in said reflectivity level;

incrementing a track count number for each said zero crossing;

passing said reflectivity level through a high pass filter to obtain a data indicator signal, wherein a waveform of said data indicator signal has indicator points corresponding to said zero crossings corresponding to changes in said reflectivity level in response to said data;

after each said incrementing, decrementing said track count number for each said zero crossing corresponding to changes in said reflectivity level in response to said data; and terminating the step of moving said optical head when said track count number equals said track crossing number.

3. A method for moving an optical head from an initial track to a target track on a storage medium having data arranged in tracks thereon, comprising the steps of:

determining a track crossing number indicating a number of said tracks between said initial track and said target track;

moving said optical head from said initial track toward said target track;

measuring a reflectivity level of light from said storage medium;

deriving a tracking error signal responsive to said reflectivity level, wherein a waveform of said tracking error signal has zero crossings corresponding to said optical head crossing one of said tracks and to changes in said reflectivity level in response to said data;

incrementing a track count number for each said zero crossing;

deriving a data indicator signal responsive to said reflectivity level, wherein a waveform of said data indicator signal has indicator points corresponding to said zero crossings corresponding to changes in said reflectivity level in response to said data;

after each said incrementing, decrementing said track count number for each said zero crossing corresponding to changes in said reflectivity level in response to said data; and terminating the step of moving said optical head when said track count number equals said track crossing number.

4. A method for moving an optical head from an initial track to a target track on a storage medium having data arranged in tracks thereon, comprising the steps of: determining a track crossing number indicating a number of said tracks between said initial track and said target track;

moving said optical head from said initial track toward said target track;

measuring a reflectivity level of light from said storage medium;

deriving a tracking error signal responsive to said reflectivity level, wherein a waveform of said tracking error signal has zero crossings corresponding to said optical head crossing one of said tracks and to increases in frequency of changes in said reflectivity level;

incrementing a track count number for each said zero crossing;

deriving a data indicator signal responsive to said reflectivity level, wherein a waveform of said data indicator signal has indicator points corresponding to said zero crossings corresponding to changes in said reflectivity level in response to said data;

after each said incrementing, decrementing said track count number for each said zero crossing corresponding to changes in said reflectivity level in response to said data; and terminating the step of moving said optical head when said track count number equals said track crossing number.

* * * * *